US007005214B2

(12) United States Patent
Takeuchi et al.

(10) Patent No.: US 7,005,214 B2
(45) Date of Patent: Feb. 28, 2006

(54) NOBLE METALS COATED ON TITANIUM CURRENT COLLECTORS FOR USE IN NONAQUEOUS LI/CF$_X$ CELLS

(75) Inventors: Esther S. Takeuchi, East Amherst, NY (US); Bruce Platt, Reisterstown, MD (US); Sally Ann Smesko, North Tonawanda, NY (US); Eric Ziarniak, Alden, NY (US); Mark Roy, Buffalo, NY (US)

(73) Assignee: Wilson Greatbatch Technologies, Inc., Clarence, NY (US)

( * ) Notice: Subject to any disclaimer, the term of this patent is extended or adjusted under 35 U.S.C. 154(b) by 424 days.

(21) Appl. No.: 10/286,726

(22) Filed: Nov. 1, 2002

(65) Prior Publication Data
US 2003/0124427 A1    Jul. 3, 2003

Related U.S. Application Data

(60) Provisional application No. 60/335,353, filed on Nov. 2, 2001.

(51) Int. Cl.
*H01M 4/66*    (2006.01)
*H01M 4/75*    (2006.01)
*H01M 4/48*    (2006.01)
*H01M 4/60*    (2006.01)

(52) U.S. Cl. .................. 429/245; 429/233; 429/231.8; 429/231.95

(58) Field of Classification Search ................ 429/233, 429/245, 231.8, 231.95
See application file for complete search history.

(56) References Cited

U.S. PATENT DOCUMENTS

| | | | |
|---|---|---|---|
| 3,717,503 | A | 2/1973 | Beggs |
| 4,037,032 | A | 7/1977 | Nidola et al. |
| 5,278,006 | A | 1/1994 | Dunham |
| 5,716,728 | A | 2/1998 | Smesko et al. |
| 5,846,675 | A | 12/1998 | Sazhin et al. |
| 5,894,403 | A | 4/1999 | Shah et al. |
| 5,920,455 | A | 7/1999 | Shah et al. |
| 6,224,985 | B1 | 5/2001 | Shah et al. |
| 6,332,900 | B1 | 12/2001 | Muffoletto et al. |
| 6,451,483 | B1 | 9/2002 | Probst et al. |
| 6,455,108 | B1 | 9/2002 | Muffoletto et al. |
| 6,468,605 | B1 | 10/2002 | Shah et al. |
| 6,783,888 | B1 * | 8/2004 | Gan et al. ............ 429/128 |

FOREIGN PATENT DOCUMENTS

| | | |
|---|---|---|
| EP | 1 087 453 A2 | 3/2001 |
| WO | WO 01/80621 A2 | 11/2001 |

* cited by examiner

*Primary Examiner*—Tracy Dove
(74) *Attorney, Agent, or Firm*—Michael F. Scalise

(57) ABSTRACT

A lithium/fluorinated carbon electrochemical cell having the CF$_x$ material supported on a titanium current collector screen sputter coated with a noble metal is described. The gold, iridium, palladium, platinum, rhodium and ruthenium-coated titanium current collector provides the cell with higher rate capability, even after exposure to high temperatures, in comparison to cells of a similar chemistry having the CF$_x$ contacted to a titanium current collector painted with a carbon coating.

15 Claims, 3 Drawing Sheets

NOBLE METALS COATED ON TITANIUM CURRENT COLLECTORS FOR USE IN NONAQUEOUS LI/CF$_X$ CELLS

CROSS REFERENCE TO RELATED APPLICATION

This application claims priority based on U.S. provisional application Ser. No. 60/335,353, filed Nov. 2, 2001.

BACKGROUND OF THE INVENTION

1. Field of the Invention

The present invention generally relates to the conversion of chemical energy to electrical energy and, more particularly, to an alkali metal electrochemical cell having a cathode current collector provided with a noble metal coating to increase electrical conductivity. A preferred cathode includes a solid active material and a most preferred cathode active material is a carbonaceous material, such as fluorinated carbon (CF$_x$).

2. Prior Art

Conventional Li/CF$_x$ cells exhibit degradation in their running voltage when they are built with titanium cathode current collector screens and stored for extended periods of time or are subjected to elevated temperature. To overcome this energy loss, it is known to coat the cathode current collector screen. Carbon paint is a suitable coating material typically used for this purpose. Carbon coating materials enable such cells to operate at increased running potentials, even after 30 days of exposure to 100° C. heat. For example, U.S. Pat. No. 6,451,483 to Probst et al., which is assigned to the assignee of the present invention and incorporated herein by reference, describes a prior art Li/CF$_x$ cell including a titanium cathode current collector screen coated with a thin layer of graphite/carbon paint.

While a coating of carbon paint on the cathode current collector screen eliminates the decreased operating potential of Li/CF$_x$ cells in comparison to untreated titanium screens, portions of the screen typically need to be masked before the paint is applied. Spot welding through the carbon paint layer for connecting the current collector to the cathode terminal structure typically results in diminished weld integrity.

SUMMARY OF THE INVENTION

Accordingly, the present invention is directed to coating a titanium screen with one of gold, iridium, palladium, platinum, rhodium and ruthenium. Preferably, a sputtering process, and the like does the coating. The thusly-processed screens are useful as a cathode current collector in a lithium/solid cathode active material cell. Welding directly to the cathode current collector increases the simplicity of the cell manufacturing process as no special masking tools or precautions are needed for screen preparation. Preferred cell chemistry is of a Li/CF$_x$ couple.

These and other objects of the present invention will become increasingly more apparent to those skilled in the art by reference to the following description and to the appended drawings.

DETAILED DESCRIPTION OF THE PREFERRED EMBODIMENTS

Figure 1:
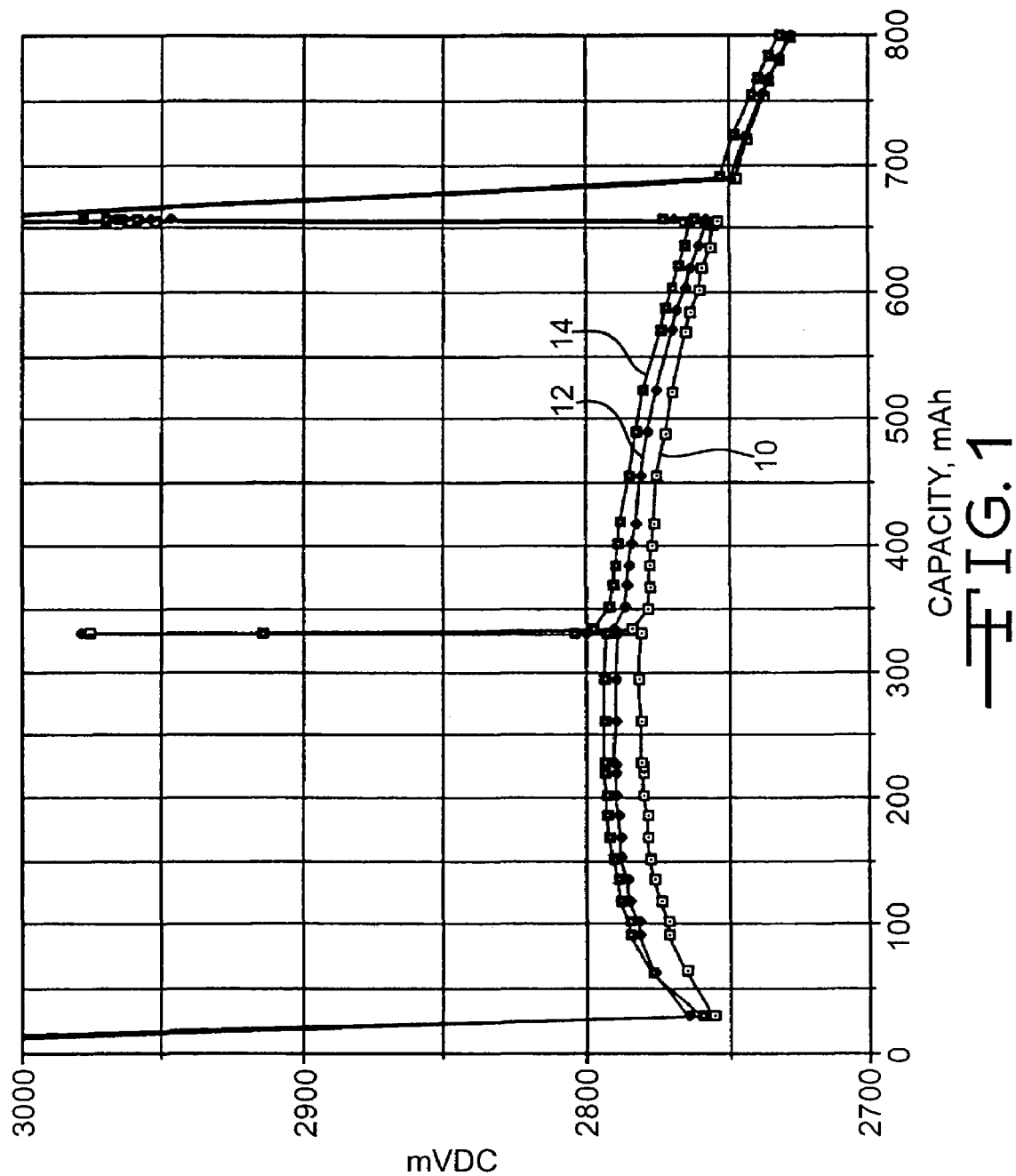
FIG. 1 is a graph of voltage versus capacity constructed from a prior art Li/CF$_x$ cell containing a carbon coated titanium cathode current collector in comparison to present invention cells having titanium screens coated with platinum and iridium, respectively, and discharged under a 2 kohm load at 37° C. with no prior high temperature storage.

As used herein, the term "pulse" means a short burst of electrical current of significantly greater amplitude than that of a pre-pulse current immediately prior to the pulse. A pulse train consists of at least two pulses of electrical current delivered in relatively short succession with or without open circuit rest between the pulses. An exemplary pulse train may consist of four 10-second pulses of about 0.5 mA/cm$^2$ to about 50 mA/cm$^2$ with a 15 second rest between each pulse.

The electrochemical cell of the present invention comprises an anode of a metal selected from Groups IA, IIA and IIIB of the Periodic Table of the Elements, including lithium, sodium, potassium, etc., and their alloys and intermetallic compounds including, for example, Li—Si, Li—Al, Li—B and Li—Si—B alloys and intermetallic compounds. The preferred anode comprises lithium. An alternate anode comprises a lithium alloy such as a lithium-aluminum alloy. The greater the amounts of aluminum present by weight in the alloy, however, the lower the energy density of the cell.

The form of the anode may vary, but preferably it is a thin metal sheet or foil of the anode metal pressed or rolled on a metallic anode current collector, i.e., preferably comprising titanium, titanium alloy or nickel, to form an anode component. The anode current collector has an integral tab or lead contacted by a weld to a cell case of conductive metal in a case-negative electrical configuration. Alternatively, the anode may be formed in some other geometry, such as a bobbin shape, cylinder or pellet to allow an alternate low surface cell design.

The electrochemical cell further comprises a cathode of electronically conductive material that serves as the counter electrode of the cell. The electrochemical reaction at the cathode involves conversion of ions that migrate from the anode to the cathode into atomic or molecular forms. The cathode of the present invention preferably comprises a solid active material such as fluorinated carbon represented by the formula (CF$_x$)$_n$ wherein x varies between about 0.1 to 1.9 and preferably between about 0.5 and 1.2 and (C$_2$F)$_n$, wherein the n refers to the number of monomer units which can vary widely. These electrode active materials are composed of carbon and fluorine, and include graphitic and non-graphitic forms of carbon, such as coke, charcoal or activated carbon.

Before fabrication into an electrode for incorporation into an electrochemical cell, the fluorinated carbon active material is preferably mixed with a conductive additive. Suitable conductive additives include acetylene black, carbon black and/or graphite. Metals such as nickel, aluminum, titanium and stainless steel in powder form are also useful as conductive diluents. The electrode further comprises a binder material that is preferably an aqueous dispersion of a fluoro-resin material such as of polytetrafluoroethylene (PTFE) or polyvinylidene fluoride (PVDF). Preferably, the cathode active material is present in the cathode at an amount of about 80% to about 98%, by weight, remainder being at least one of the binder material and the conductive additive, each in an amount of about 1% to about 3%, by weight.

Additional solid active materials which are useful in an electrochemical cell according to the invention include silver vanadium oxide, copper silver vanadium oxide, manganese dioxide, lithium cobalt oxide, lithium nickel oxide, copper oxide, titanium disulfide, copper sulfide, iron sulfide, iron disulfide, copper vanadium oxide, and mixtures thereof. However, the preferred cathode active mixture comprises $CF_x$ combined with acetylene black and/or graphite, and PTFE. In a particularly preferred embodiment of the present invention, the gram amount of anode active material to that of the cathode active material, referred to as the A/C weight ratio, is about 1.03, as in the previously discussed Probst et al. cell.

The cathode active mixture is pressed onto a suitable current collector selected from the group consisting of stainless steel, titanium, tantalum, platinum and gold. The preferred current collector material is titanium, and most preferably the titanium cathode current collector has a thin layer of one of gold, iridium, palladium, platinum, rhodium and ruthenium, or combinations thereof, applied thereto. The gold, iridium, palladium, platinum, rhodium and ruthenium coating is in the range of about 20 $\mu$inches to about 100 $\mu$inches, more preferably about 50 $\mu$inches.

In comparison, conventionally used carbon paint can only be applied at thicknesses down to about 500 $\mu$inches. This means that with the present coating materials there is more room for active materials.

A preferred coating technique is to sputter the material onto the current collector. Sputtering is defined as the deposition of atoms vaporized from a surface by a non-thermal vaporization process in which surface atoms are physically ejected by momentum transfer from an atomic sized energetic bombarding particle. The sputtered particle is usually a gaseous ion accelerated from plasma or an ion gun.

Other suitable processes for coating the cathode current collector with gold, iridium, palladium, platinum, rhodium and ruthenium include painting, dipping, air atomization spraying, electrolysis, chemical vapor deposition, physical vapor deposition (U.S. Pat. No. 6,332,900 to Muffoletto et al.), and ultrasonic air atomization spraying (U.S. Pat. No. 5,894,403 to Shah et al. U.S. Pat. No. 5,920,455 to Shah et al., U.S. Pat. No. 6,224,985 to Shah et al., and U.S. Pat. No. 6,224,985 to Shah et al.). These patent are assigned to the assignee of the present invention and incorporated herein by reference.

U.S. Pat. No. 6,455,108 to Muffoletto et al., which is assigned to the assignee of the present invention and incorporated herein by reference, describes various other methods for depositing gold, iridium, palladium, platinum, rhodium and ruthenium as a powder, solution or a wire of the coating materials onto a titanium substrate. Powder flame spraying is one technique and involves the use of a powder flame spray gun consisting of a high capacity, oxygen-fuel gas torch and a hopper containing the coating material in powder or particulate form. A small amount of oxygen from the gas supply is diverted to carry the powdered coating material by aspiration into the oxygen-fuel gas flame where the powder is heated and propelled by the exhaust flame onto the current collector substrate. The fuel gas is usually acetylene or hydrogen and temperatures in the range of about 3,000° F. to 4,5000° F. is typically obtained. Particle velocities are on the order of about 80 to about 100 feet per second.

Wire/rod flame spraying is another suitable technique that utilizes a wire of the coating material that is continuously fed into an oxy-acetylene flame where the wire is melted and atomized by an auxiliary stream of compressed air and then deposited onto the current collector substrate. This process also lends itself to use of plastic tubes filled with the coating material in a powder form.

High velocity, oxygen fuel flame spraying is a continuous combustion process that produces exit gas velocities estimated to be about 4,000 to about 5,000 feet per second and particle speeds of about 1,800 to about 2,600 feet per second. This is accomplished by burning a fuel gas (usually propylene) with oxygen under high pressure (60 to 90 psi) in an internal combustion chamber. Hot exhaust gases are discharged from the combustion chamber through exhaust ports and thereafter expanded in an extending nozzle. Coating powder or solution is fed axially into the extending nozzle and confined by the exhaust gas stream until the material exits in a thin high-speed jet to produce the desired coatings.

A modified flame spraying process is referred to as a flame spray and fuse process. In this process, the current collector is prepared by coating one of gold, iridium, palladium, platinum, rhodium and ruthenium, and mixtures thereof thereon using one of the above described flame-spraying processes followed by a fusing step. Fusing is accomplished by one of several techniques such as flame or torch, induction, or in vacuum, inert or hydrogen furnaces. Typical heating times range from about one-half hour to about six hours.

Another coating technique comprises a detonation/explosive flame spraying process, which uses detonation waves from repeated explosions of oxyacetylene gas mixtures to accelerate the powered coating materials onto the current collector substrate. Particulate velocities on the order of 2,400 feet per second are achieved.

Still another coating process is electrical heating thermal spraying. One such electrical heating thermal spraying process is referred to as the electric arc or twin-wire arc spraying process and uses two consumable wires of the coating material. The wires are initially insulated from each other and simultaneously advanced to meet at a focal point in an atomizing gas stream. Contact tips serve to precisely guide the wires and to provide good electrical contact between the moving wires and power cables. Heating is provided by means of a direct current potential difference applied across the wires to form an arc that melts the intersecting wires. A jet of gas (normally compressed air) shears off molten droplets of the melted coating material and propels it onto the substrate. Direct current is supplied at potentials of about 18 to 40 volts.

Plasma spraying involves the passage of a gas or a gas mixture through a direct current arc maintained in a chamber between a coaxially aligned cathode and water-cooled anode. The arc is initiated with a high frequency discharge that partially ionizes the gas to create a plasma having temperatures that may exceed 30,000° F. The plasma flux exits the gun through a hole in the anode that acts as a nozzle and the temperature of the expelled plasma effluent falls rapidly with distance. Powdered coating material feedstock is introduced into the hot gaseous effluent at an appropriate point and propelled to the work piece by the high velocity stream. The heat content, temperature and velocity of the plasma gas are controlled by regulating arc current, gas flow rate, and the type and mixture ratio of gases and by the anode/cathode configuration.

Cathodes prepared as described above may be in the form of one or more plates operatively associated with at least one or more plates of anode material, or in the form of a strip wound with a corresponding strip of anode material in a structure similar to a "jellyroll".

In order to prevent internal short circuit conditions, the cathode is separated from the Group IA, IIA or IIIB anode material by a suitable separator material. The separator is of electrically insulative material, and the separator material also is chemically unreactive with the anode and cathode active materials and both chemically unreactive with and insoluble in the electrolyte. In addition, the separator material has a degree of porosity sufficient to allow flow therethrough of the electrolyte during the electrochemical reaction of the cell. Illustrative separator materials include fabrics woven from polypropylene and fluoropolymeric fibers including polyvinylidene fluoride, polyethylenetetrafluoroethylene, and polyethylenechlorotrifluoroethylene used either alone or laminated with a fluoropolymeric microporous film, non-woven glass, polypropylene, polyethylene, glass fiber materials, ceramics, a polytetrafluoroethylene (PTFE) membrane commercially available under the designation ZITEX (Chemplast Inc.), a polypropylene membrane commercially available under the designation CELGARD (Celanese Plastic Company, Inc.) and a membrane commercially available under the designation DEXIGLAS (C. H. Dexter, Div., Dexter Corp.). A preferred separator comprises two layers of a microporous polypropylene film.

The electrochemical cell of the present invention further includes a non-aqueous, ionically conductive electrolyte that serves as a medium for migration of ions between the anode and the cathode electrodes during the electrochemical reactions of the cell. Suitable non-aqueous electrolytes are substantially inert to the anode and cathode materials, and they exhibit those physical properties necessary for ionic transport, namely, low viscosity, low surface tension and wettability.

A suitable electrolyte has an inorganic, ionically conductive salt dissolved in a non-aqueous solvent. More preferably, the electrolyte includes an ionizable lithium salt dissolved in a mixture of aprotic organic solvents comprising a low viscosity solvent and a high permittivity solvent. The inorganic, ionically conductive salt serves as the vehicle for migration of the anode ions to intercalate or react with the cathode active material and is selected from $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof. Suitable salt concentrations typically range between about 0.8 to 1.5 molar. The electrolyte-to-cathode (E/C) weight ratio is preferably about 0.938 to 0.73 (based on the gram amount of cathode active material).

Low viscosity solvents include esters, linear and cyclic ethers and dialkyl carbonates such as tetrahydrofuran (THF), methyl acetate (MA), diglyme, trigylme, tetragylme, dimethyl carbonate (DMC), 1,2-dimethoxyethane (DME), 1,2-diethoxyethane (DEE), 1-ethoxy, 2-methoxyethane (EME), ethyl methyl carbonate (EMC), methyl propyl carbonate, ethyl propyl carbonate, diethyl carbonate (DEC), dipropyl carbonate, and mixtures thereof. High permittivity solvents include cyclic carbonates, cyclic esters and cyclic amides such as propylene carbonate (PC), ethylene carbonate (EC), butylene carbonate, acetonitrile, dimethyl sulfoxide, dimethyl formamide, dimethyl acetamide, γ-valerolactone, γ-butyrolactone (GBL), N-methyl-pyrrolidinone (NMP), and mixtures thereof. In the present invention, the preferred anode is lithium metal and the preferred electrolyte for $CF_x$ is 1.0 M to 1.4 M $LiBF_4$ in γ-butyrolactone (GBL).

The preferred form of the electrochemical cell is a case-negative design wherein the anode/cathode couple is inserted into a conductive metal casing with the casing connected to the anode current collector. A preferred material for the casing is stainless steel although titanium, mild steel, nickel, nickel-plated mild steel and aluminum are also suitable. The casing header comprises a metallic lid having a sufficient number of openings to accommodate the glass-to-metal seal/terminal pin feedthrough for the cathode electrode. The anode electrode is preferably connected to the case or the lid. An additional opening is provided for electrolyte filling. The casing header comprises elements having compatibility with the other components of the electrochemical cell and is resistant to corrosion. The cell is thereafter filled with the electrolyte solution described hereinabove and hermetically sealed such as by close-welding a stainless steel plug over the fill hole, but not limited thereto. The cell of the present invention can also be constructed in a case-positive design.

The following examples describe the manner and process of manufacturing an electrochemical cell according to the present invention, and they set forth the best mode contemplated by the inventors of carrying out the invention, but they are not to be construed as limiting.

EXAMPLE I

Titanium screens (0.002") thick were sputter-coated with either iridium or platinum, producing a coating of about 50 μinches. Prior art current collectors were manufactured having carbon painted on the screens. The respective screens were subsequently used as the cathode current collectors in prismatic $Li/CF_x$ test cells housed in a casing having nominal dimensions of 45 mm.×22 mm.×5 mm. (referred to as a 5 mm. $Li/CF_x$ cell). The cells were built using about 1.68 gram cathodes composed of, by weight, about 91% $CF_x$, about 4% PTFE binder, and about 5% acetylene black. Lithium metal pressed to a titanium current collector served as the anode. The lithium A/C capacity ratio was about 1.03 to about 1.05. The electrolyte was 1 M $LiBF_4$ in GBL present in an E/C weight ratio of at least 0.86.

Each cell was predischarged at 37° C. using a 1.5-kohm load for 9 hours. Following a one-week open circuit storage period at 37° C., the cells were subjected to a pulse train consisting of four 10 mA pulses. Each pulse was applied for 10 seconds with a 15 second rest between the pulses. The pulsing current was then increased in magnitude to determine the maximum current that could be applied to each cell prior to it reaching a minimum voltage of 2.0 V.

Following this burn-in procedure, the cells were divided into three discharge protocols. One cell from each screen type was placed directly under a 2-kohm load for discharge at 37° C. Periodically, the cells were pulse tested by again applying currents of increasing magnitude until a minimum of 2.0 V was obtained.

FIG. 1 illustrates the discharge results of these cells under a 2-kohm load with no prior high temperature exposure. In particular, curve 10 was constructed from the discharge of the cell having a carbon painted cathode screen, curve 12 is of the cell having a platinum sputter coated cathode screen and curve 14 is of the cell having an iridium coated cathode screen. All three cells were tested without exposure to a high temperature environment. The spikes in the discharge curves are from an open circuit condition.

EXAMPLE II

Two cells of each screen type as constructed in Example I were randomly selected and placed on open circuit storage at 100° C. for 10 days. Following this storage period, the cells were placed under 2 k ohm loads and subsequently discharged and pulse tested at 37° C.

Figure 2:
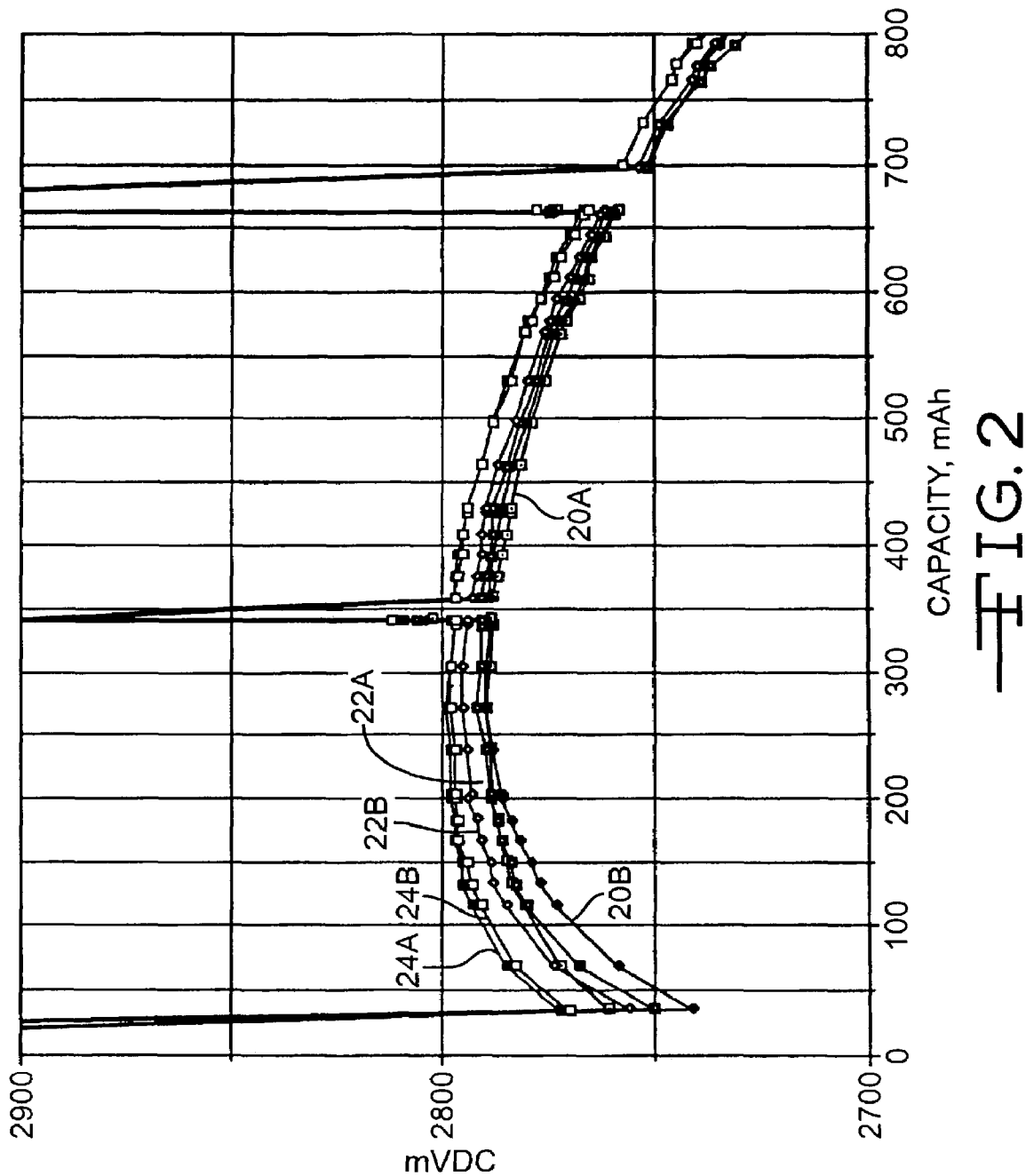
FIG. 2 is a voltage versus capacity graph constructed from two prior art Li/CF$_x$ cells in comparison to present invention cells having titanium screens coated with platinum and iridium, respectively, and discharged under a 2 kohm load at 37° C. after 10 days of open circuit storage at 100° C.

FIG. 2 illustrates the discharge results of the cells under a 2-kohm load after exposure to 10 days of open circuit storage at 100° C. In particular curves 20A and 20B were constructed from the discharge of the cells having a carbon painted cathode screen, curves 22A and 22B are of the cells having a platinum sputter coated cathode screen and curves 24A and 24B are of the cell having an iridium coated cathode screen. The spikes in the discharge curves are from an open circuit condition.

EXAMPLE III

Two cells of each screen type as constructed in Example I were also placed on open circuit storage at 100° C. for 30 days. Following storage, this second cell group of was placed under a 2-kohm load-and discharged at 37° C. These cells were also periodically pulse tested.

Figure 3:
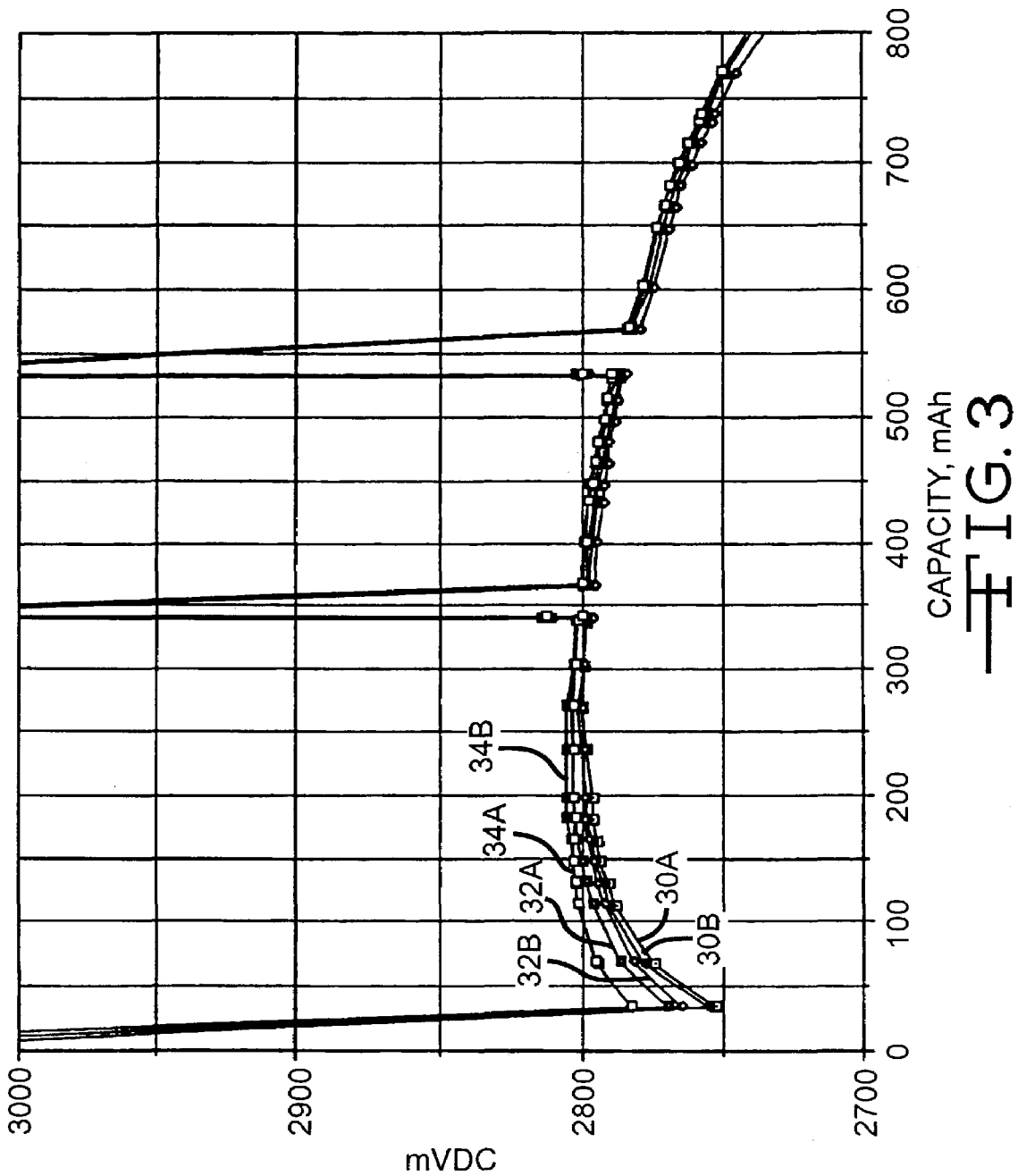
FIG. 3 is a voltage versus capacity graph constructed from two prior art Li/CF$_x$ cells in comparison to present invention cells having titanium screens coated with platinum and iridium, respectively, and discharged under a 2 kohm load at 37° C. after 30 days of open circuit storage at 100° C.

FIG. 3 illustrates the discharge results of the cells under a 2-kohm load after 30 days of open circuit storage at 100° C. In particular, curves 30A and 30B were constructed from the discharge of the cells having a carbon painted cathode screen, curves 32A and 32B are of the cells having a platinum sputter coated cathode screen and curves 34A and 34B are of the cells having an iridium coated cathode screen. The spikes in the discharge curves are from an open circuit condition.

TABLE 1

| Screen type | mV | Wh/cc* | Comments |
|---|---|---|---|
| Control-carbon painted | 2780 | 0.988 | No high temperature exposure |
| Pt sputter coated | 2790 | 0.992 | No high temperature exposure |
| Ir sputter coated | 2793 | 0.993 | No high temperature exposure |
| Control | 2789 | 0.991 | 10 days at 100° C. |
| Control | 2790 | 0.992 | |
| Pt sputter coated | 2791 | 0.992 | 10 days at 100° C. |
| | 2793 | 0.993 | |
| Ir sputter coated | 2798 | 0.994 | 10 days at 100° C. |
| | 2797 | 0.994 | |
| Control | 2798 | 0.994 | 30 days at 100° C. |
| Control | 2798 | 0.994 | |
| Pt sputter coated | 2803 | 0.996 | 30 days at 100° C. |
| | 2799 | 0.995 | |
| Ir sputter coated | 2805 | 0.997 | 30 days at 100° C. |
| | 2803 | 0.996 | |

*Calculated using a theoretical capacity of 1.315 Ah and a cell volume of 3.7 cc.

The discharge results graphed in FIGS. 1 to 6 and shown in Table 1 illustrate that the operating voltage is significantly higher for Li/CF$_x$ cells utilizing iridium-sputter coated or platinum-sputter coated cathode current collector screens than a similarly built cell prior art cell.

Table 2 presents the pulse 1 and pulse 4 voltage minima recorded at various depth of discharge (DOD) for the cells stored for 30 days at 100° C. and periodically subjected to pulse trains consisting of four 10 mA pulses applied for 10 seconds with a 15 second rest between the pulses. After undergoing high temperature exposure, the present invention Li/CF$_x$ cells using the sputter-coated screens obtain higher pulse minimum voltages.

TABLE 2

| Screen | Cathode Wt. (g) | Electrolyte Wt. (g) | % DOD | Days at 100° C. | P (1 min) under 10 mA (mV) | P (4 min) under 10 mA (mV) | Maximum current range, mA* |
|---|---|---|---|---|---|---|---|
| Carbon painted (control) | 1.690 | 1.602 | 0 | 0 | 2996 | 2659 | 20 < x < 50 |
| | | | 25 | 30 | 2771 | 2747 | 100 < x < 120 |
| | | | 39 | 30 | 2720 | 2703 | 120 < x < 150 |
| Carbon painted (control) | 1.693 | 1.569 | 0 | 0 | 3035 | 2695 | 20 < x < 50 |
| | | | 25 | 30 | 2776 | 2749 | 120 < x < 150 |
| | | | 39 | 30 | 2732 | 2712 | 120 < x < 150 |
| Pt sputter coated | 1.693 | 1.569 | 0 | 0 | 2810 | 2563 | 20 < x < 50 |
| | | | 25 | 30 | 2791 | 2764 | 120 < x < 150 |
| | | | 39 | 30 | 2744 | 2722 | 120 < x < 150 |
| Pt sputter coated | 1.655 | 1.635 | 0 | 0 | 2686 | 2478 | 20 < x < 50 |
| | | | 25 | 30 | 2739 | 2688 | 120 < x < 150 |
| | | | 39 | 30 | 2747 | 2727 | 120 < x < 150 |
| Ir sputter coated | 1.682 | 1.577 | 0 | 0 | 2776 | 2595 | 20 < x < 50 |
| | | | 25 | 30 | 2822 | 2795 | 180 < x < 200 |
| | | | 39 | 30 | 2771 | 2751 | 120 < x < 150 |
| Ir sputter coated | 1.689 | 1.552 | 0 | 0 | 2783 | 2610 | 20 < x < 50 |
| | | | 25 | 30 | 2827 | 2800 | 150 < x < 180 |
| | | | 39 | 30 | 2778 | 2756 | 150 < x < 180 |

*X represents the maximum current

Table 2 also includes the maximum applied currents before the cells obtained a closed circuit voltage of 2.0 V under pulse. Again, the results indicate that the use of a noble metal sputter coating on the titanium cathode current collector increases the rate capability of a Li/CF$_x$ cell after about 25% DOD by allowing for higher voltages under greater operating currents. These results coincide with the ranking of the materials in terms of increasing electrical resistivity. It is known that iridium has an electrical resistivity of 5.3 $\mu\Omega$-cm at 20° C., platinum is of 10.6 $\mu\Omega$-cm at 20° C., and carbon is of 1375 $\mu\Omega$-cm at 0° C.

Additionally, the reduced thickness of the noble coating in comparison to a carbon coating means that the cell has relatively more volumetric efficiency. The thinnest conventional carbon coatings are about 500 $\mu$inches while in comparison about 20 $\mu$inches to about 100 $\mu$inches for the present coatings.

It is appreciated that various modifications to the inventive concepts described herein may be apparent to those skilled in the art without departing from the spirit and the scope of the present invention defined by the hereinafter appended claims.

What is claimed is:

1. An electrochemical cell, which comprises:
   a) an anode comprising lithium;
   b) a cathode comprising a solid cathode active material contacted to a conductive current collector comprising titanium provided with a coating selected from the group consisting of gold, iridium, palladium, platinum, rhodium, ruthenium, and mixtures thereof, wherein the coating has a thickness of about 20 $\mu$inches to about 100 $\mu$inches; and
   c) an electrolyte activating the anode and the cathode.

2. The electrochemical cell of claim 1 wherein the cathode active material comprises fluorinated carbon.

3. The electrochemical cell of claim 2 wherein the lithium and the fluorinated carbon are present in an anode-to-cathode capacity ratio in a range of about 1.03 to about 1.05 (based on a gram amount of active material) and wherein the electrolyte and the fluorinated carbon are present in an electrolyte-to-cathode weight ratio of about 0.938 to about 0.73 (based on a gram amount of cathode active material).

4. An electrochemical cell, which comprises:
   a) an anode comprising lithium;
   b) a cathode comprising a cathode active material selected from the group consisting of fluorinated carbon, silver vanadium oxide, copper-silver-vanadium oxide, manganese dioxide, lithium cobalt oxide, lithium nickel oxide, copper oxide, titanium disulfide, copper sulfide, iron sulfide, iron disulfide, copper vanadium oxide, and mixtures thereof contacted to a conductive current collector comprising titanium provided with a coating selected from the group consisting of gold, iridium, palladium, platinum, rhodium, ruthenium, and mixtures thereof, wherein the coating has a thickness of about 20 $\mu$inches to about 100 $\mu$inches; and
   c) an electrolyte activating the anode and the cathode.

5. The electrochemical cell of claim 4 wherein the cathode active material is fluorinated carbon present in an anode-to-cathode capacity ratio in a range of about 1.03 to about 1.05 (based on a gram amount of active material) and wherein the electrolyte and the fluorinated carbon are present in an electrolyte-to-cathode weight ratio of about 0.938 to about 0.73 (based on a gram amount of cathode active material).

6. The electrochemical cell of claim 4 wherein the cathode active material is present in the cathode at an amount of about 80% to about 98%, by weight, remainder being selected from the group consisting of a binder material, a conductive additive, and mixtures thereof.

7. The electrochemical cell of claim 6 wherein the binder material is a fluoro-resin powder.

8. The electrochemical cell of claim 6 wherein the conductive additive is selected from the group consisting of carbon, graphite power, acetylene black and a metallic powder selected from the group consisting of titanium, aluminum, nickel, stainless steel, and mixtures thereof.

9. The electrochemical cell of claim 4 wherein the anode further includes a current collector selected from the group consisting of titanium, nickel, copper, tungsten and tantalum.

10. The electrochemical cell of claim 4 wherein the electrolyte comprises a lithium salt selected from the group consisting of $LiPF_6$, $LiBF_4$, $LiAsF_6$, $LiSbF_6$, $LiClO_4$, $LiO_2$, $LiAlCl_4$, $LiGaCl_4$, $LiC(SO_2CF_3)_3$, $LiN(SO_2CF_3)_2$, $LiSCN$, $LiO_3SCF_3$, $LiC_6F_5SO_3$, $LiO_2CCF_3$, $LiSO_6F$, $LiB(C_6H_5)_4$, $LiCF_3SO_3$, and mixtures thereof.

11. The electrochemical cell of claim 4 wherein the electrolyte comprises at least one organic solvent selected from the group consisting of tetrahydrofuran, methyl acetate, diglyme, trigylme, tetragylme, dimethyl carbonate, 1,2-dimethoxyethane, 1,2-diethoxyethane, 1-ethoxy, 2-methoxyethane, ethyl methyl carbonate, methyl propyl carbonate, ethyl propyl carbonate, diethyl carbonate, dipropyl carbonate, propylene carbonate, ethylene carbonate, butylene carbonate, acetonitrile, dimethyl sulfoxide, dimethyl formamide, dimethyl acetamide, γ-valerolactone, γ-butyrolactone, N-methyl-pyrrolidinone, and mixtures thereof.

12. The electrochemical cell of claim 4 housed in a conductive casing comprising a material selected from the group consisting of titanium, stainless steel, mild steel, nickel, nickel-plated mild steel, and aluminum.

13. The electrochemical cell of claim 4 wherein the anode comprises lithium contacted to a nickel current collector and the cathode comprises fluorinated cathode active material contacted to a titanium current collector provided with the coating having a thickness of about 50 $\mu$inches and wherein the anode and the cathode are activated with the electrolyte comprising $LiBF_4$ in γ-butyrolactone.

14. The electrochemical cell of claim 4 wherein the coating is characterized as having been sputter coated to the current collector.

15. An electrochemical cell, which comprises:
   a) an anode comprising lithium contacted to a nickel current collector;
   b) a cathode comprising fluorinated carbon contacted to a titanium current collector provided with a coating selected from the group consisting of gold, iridium, palladium, platinum, rhodium, ruthenium, and mixtures thereof, wherein the coating has a thickness of about 20 $\mu$inches to about 100 $\mu$inches; and
   c) an electrolyte comprising $LiBF_4$ in $\mu$-butyrolactone activating the anode and the cathode.

* * * * *